(12) United States Patent
Chen

(10) Patent No.: US 7,066,051 B2
(45) Date of Patent: Jun. 27, 2006

(54) METHOD AND APPARATUS FOR FORMING MULTI-COLORED CAP PART OF SNAP BUTTON

(75) Inventor: Chung-Lung Chen, Taipei (TW)

(73) Assignee: Button International Co., Ltd., Taipei (TW)

( * ) Notice: Subject to any disclaimer, the term of this patent is extended or adjusted under 35 U.S.C. 154(b) by 103 days.

(21) Appl. No.: 10/736,527

(22) Filed: Dec. 17, 2003

(65) Prior Publication Data

US 2005/0132547 A1    Jun. 23, 2005

(51) Int. Cl.
*A44B 1/06*    (2006.01)
(52) U.S. Cl. .............................. 79/1; 79/2; 79/3; 79/4; 79/5
(58) Field of Classification Search ................ 79/1, 79/2, 3, 4, 5; 264/132, 512
See application file for complete search history.

(56) References Cited

U.S. PATENT DOCUMENTS

| | | | | |
|---|---|---|---|---|
| 3,057,017 A | * | 10/1962 | Sucher | ................ 264/132 |
| 3,349,448 A | * | 10/1967 | Carocci | ....................... 24/92 |
| 3,997,052 A | * | 12/1976 | Eddy et al. | ................ 206/348 |
| 5,098,633 A | * | 3/1992 | Hausler | ..................... 264/511 |
| 2005/0061111 A1 | * | 3/2005 | Bruennel | ......................... 79/3 |

\* cited by examiner

*Primary Examiner*—Derris H. Banks
*Assistant Examiner*—Jason Pahng
(74) *Attorney, Agent, or Firm*—Troxell Law Office, PLLC

(57) ABSTRACT

A method for forming a multi-colored cap part of a snap button including the steps of forming a design portion of the cap part of snap button using a first group of molds, which includes a first female mold, a first male mold, and a plate-shaped middle mold, and a slide-plate mold adapted to movably assembled to the first male mold and having a plurality of mold cavities for forming the design portion; removing the slide-plate mold having the design portion molded therein from the first male mold; movably positioning the slide-plate mold into a second female mold included in a second group of molds for forming a body portion of the cap part of snap button; positioning a post for the cap part of snap button in a second male mold of the second group of molds; and forming the body portion.

6 Claims, 5 Drawing Sheets

METHOD AND APPARATUS FOR FORMING MULTI-COLORED CAP PART OF SNAP BUTTON

FIELD OF THE INVENTION

The present invention relates to method and apparatus for forming a multi-colored cap part of snap button, and more particularly to method and apparatus for forming a multi-colored cap part of snap button in which different slide-plate molds are selectively assembled to a mold for forming a design on a front surface of the cap part of snap button or a mold for forming a main body of the cap part of snap button, so that a multi-colored cap part of snap button may be formed using the same one core mold.

BACKGROUND OF THE INVENTION

Generally, a cap part of snap button has a front surface defining a specific surface area, on which various kinds of designs may be selectively provided to achieve decorating and advertising effects.

In earlier stages, the required advertising and/or decorating design is formed on the front surface of the cap part of snap button by way of metal working or printing. However, the design so formed on the front surface of the cap part of snap button has poor quality and visual effect. In recent years, most cap parts of snap buttons are made with plastic material through injection molding. By way of multiple injections of different plastic materials, various designs may be formed on the front surface of the cap part of snap button. However, to enable multiple injections and distribution of plastic materials of different colors and properties at different stages, only non-closed designs may be formed on the front surface of the cap part of snap button. When it is desired to form a closed design, a relatively complicate mold assembly including multiple pieces of molds must be used in injection molding.

Taiwanese New Utility Model Patent published under No. 412944 discloses a cap part of snap button having a front surface design with a closed frame. According to the above-mentioned Taiwanese patent, a body portion of the cap part of snap button is first formed in a mold through injection molding, and then, a raised and closed frame is provided on a front surface of the molded body portion. Finally, a design portion having a color and properties different from that of the body portion is formed through a second injection molding, so that a cap part of snap button showing a design with a closed frame is formed. However, the following disadvantages are found in the process of molding the above-described cap part of snap button:

1. The half-finished product must be removed from the initial molds and correctly positioned at another place for a second time injection molding. The molding process is therefore troublesome.
2. The plastic materials for molding are subject to serious compression and deformation during the two injection molding processes. And, in the event all the differently colored plastic materials are soft plastics, it is difficult to complete the injection molding.
3. The second injection molding will encounter the problem of limited area of thrust surface.
4. The process could not be applied to a cap part of snap button including both closed and non-closed designs, such as a trademark device recognizing specific products.

SUMMARY OF THE INVENTION

It is therefore a primary object of the present invention to provide method and apparatus for forming a multi-colored cap part of snap button. The apparatus includes different slide-plate molds that may be selectively assembled to a mold for forming a design on a front surface of the cap part of snap button and a mold for forming a main body of the cap part of snap button, so that a multi-colored cap part of snap button may be formed using the same one core mold. With the apparatus of the present invention, either a closed or a non-closed design may be formed on the cap part of snap button in a quick and convenient manner without the problems of deformed and undesirably compressed molding materials.

In the case soft plastics are used for forming the body portion and the design portion using the method of the present invention, the cap part of snap button may still be successfully injection molded without being limited by the area of thrust surface thereof.

Another object of the present invention is to provide method and apparatus for forming a multi-colored cap part of snap button, so that a fully automated operatorless production process may be achieved.

To achieve the above and other objects, the method of the present invention includes at least the steps of forming a design portion of the cap part of snap button using a first group of molds, which includes a first female mold, a first male mold, a plate-shaped middle mold, and a slide-plate mold adapted to movably assembled to the first male mold and having a plurality of mold cavities for forming the design portion; removing the slide-plate mold having the design portion molded therein from the first male mold; movably positioning the slide-plate mold into a second group of molds, which includes a second female mold and a second male mold, for forming a body portion of the cap part of snap button; positioning a post for the cap part of snap button in the second group of molds; and forming the body portion while associating it with the design portion through injection molding to produce a complete molded cap part of snap button.

And, the apparatus according to the present invention mainly includes:

a first group of molds for forming a design portion of the cap part of snap button; and the first group of molds includes a first male mold, which is internally provided at predetermined positions with a first pair of guide channels;

a second groups of molds for forming a body portion of the cap part of snap button; and the second group of molds includes a second female mold, which is internally provided at predetermined positions with a second pair of guide channels, and a second male mold, in which a post for the cap part of snap button is pre-positioned at a predetermined position; and a slide-plate mold adapted to selectively engage with the first pair of guide channels in the first male mold and the second pair of guide channels in the second female mold, so as to cooperate with the first and the second group of molds to respectively form the design portion and the body portion of the cap part of snap button in two injection molding processes; and the slide-plate mold is provided with mold cavities corresponding to the design portion to be formed.

In another feasible embodiment of the method of the present invention, a step is further included to remove the slide-plate mold from the second group of molds after a finished cap part of snap button is formed, and assemble the slide-plate mold to the first male mold to start a next injection molding to enable a circular molding process.

In a preferred embodiment of the apparatus of the present invention, a bi-directional conveyer is located between the first and the second group of molds to convey the slide-plate mold to and from the second group of molds.

In a further embodiment of the present invention, the slide-plate mold is provided in the mold cavities with locating elements depending on an actual design portion to be formed on the cap part of snap button.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
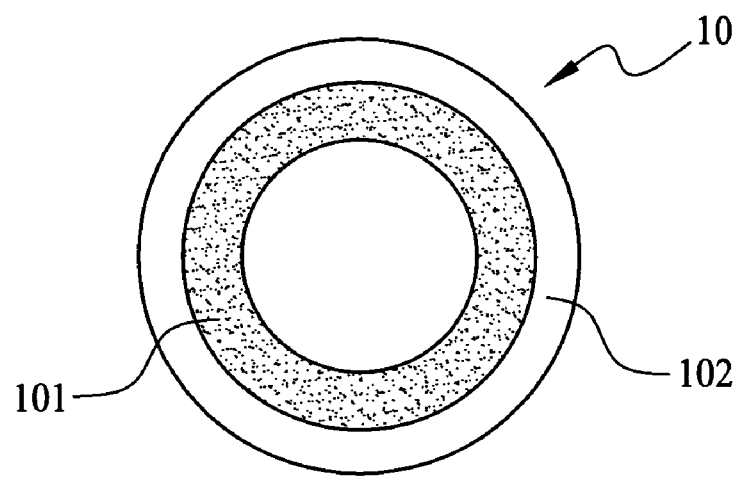
FIG. 1 is a front view of a cap part of snap button formed using the method and the apparatus of the present invention.
Figure 2:
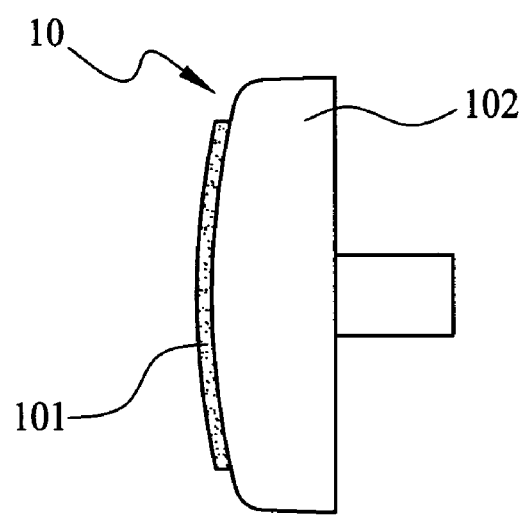
FIG. 2 is a side view of the cap part of snap button of FIG. 1.

Please refer to FIGS. 1 and 2 that are front and side views, respectively, of a cap part of snap button 10 that is to be formed using a method of the present invention.

As shown, the cap part of snap button 10 generally includes a design portion 101 formed via a first injection molding for showing, for example, a logo, and a body portion 102 formed via a second injection molding.

Figure 3:
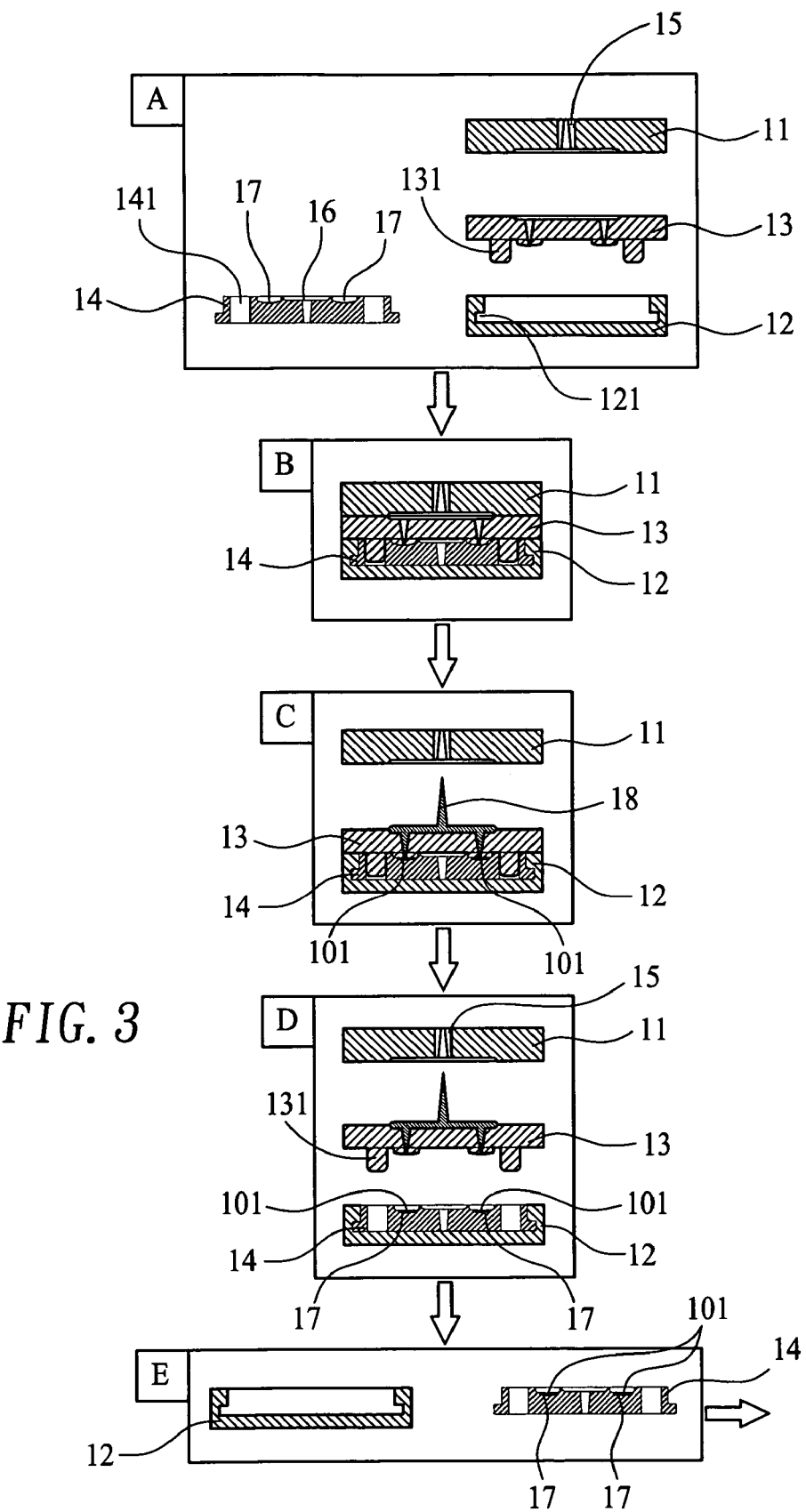
FIGS. 3 and 4 are flow charts showing steps included in the method of the present invention for forming a multi-colored cap part of snap button.
Figure 4:
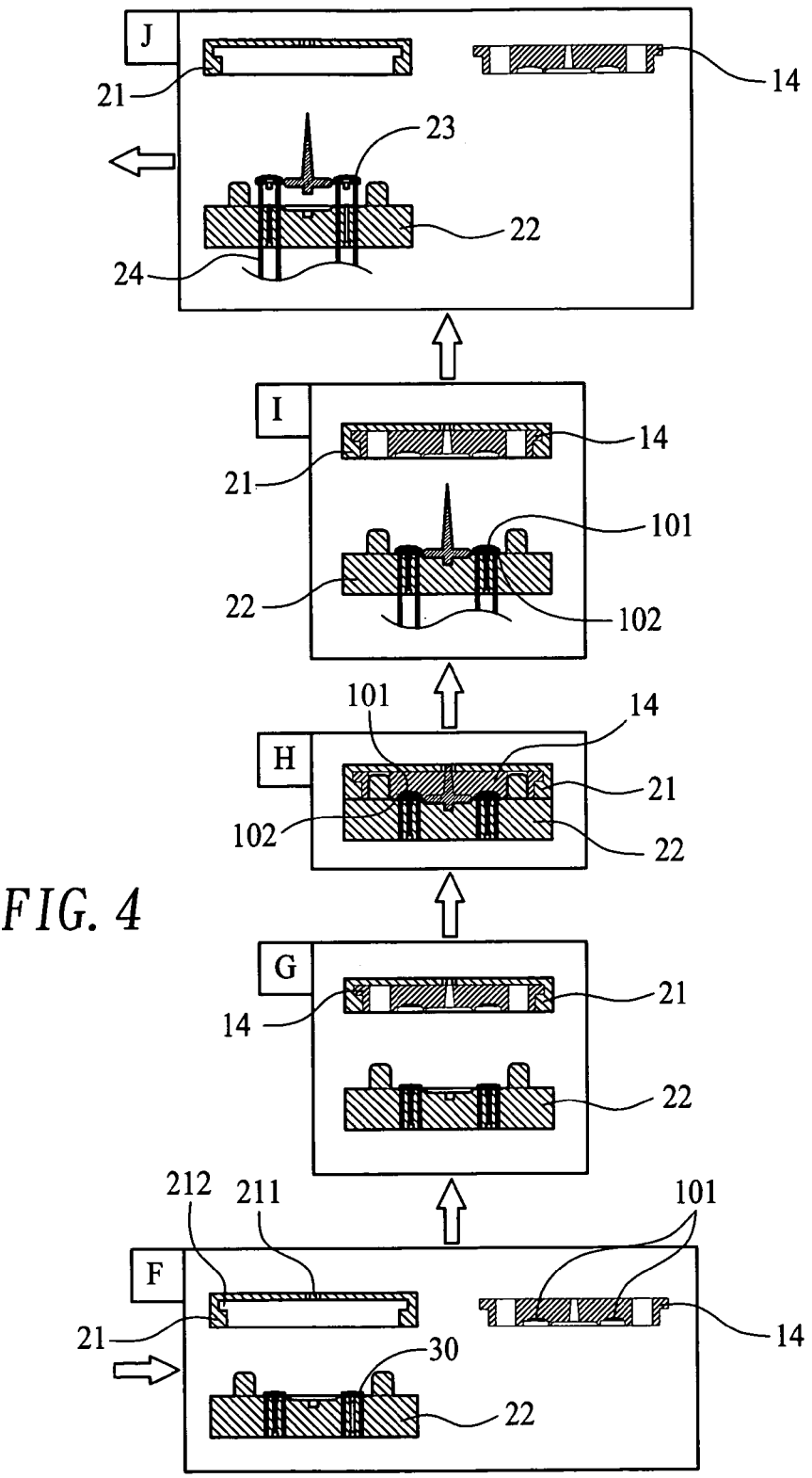

FIGS. 3 and 4 illustrate a series of steps A through J included in a molding process according to a preferred embodiment of the method of the present invention for forming the cap part of snap button 10. FIGS. 3 and 4 also illustrate different molds for forming the cap part of snap button 10 using the method of the present invention. More specifically, FIG. 3 illustrates steps A to E and molds for injection molding the design portion 101 of the multi-colored cap part of snap button 10; and FIG. 4 illustrates steps F to J and molds for injection molding the body portion 102 of the multi-colored cap part of snap button 10. It is noted the molding process performed according to the method of the present invention is an automated circular process, and the step A may be directly performed after the step J is completed.

Please refer to FIG. 3. To form the design portion 101, a first group of molds, which includes a first female mold 11, a first male mold 12, and a plate-shaped middle mold 13, and a slide-plate mold 14, are provided in step A. The slide-plate mold 14 is adpated to movably assemble to the first male mold 12. In the illustrated embodiment, the first male mold 12 is open-topped and provided at two inner lower corners with a first pair of guide channels 121, with which the slide-plate mold 14 is movably engaged to locate in the first male mold 12. The slide-plate mold 14 is provided with a flow passage 16 corresponding to a feed opening 15 provided on a top of the first female mold 11, a plurality of mold cavities 17 for forming the design portion 101, and locating holes 141 corresponding to locating rods 131 provided on the plate-shaped middle mold 13.

In step B, the above-mentioned molds 11, 12, 13, and 14 are assembled in a predetermined manner to provide a mold assembly, and molding material is fed into the mold assembly via the feed opening 15 on the first female mold 11 for injection molding. In step C, the first female mold 11 is removed from the mold assembly, and a molded head 18 is broken. In step D, the design portion 101 has been molded in the mold cavities 17 on the slide-plate mold 14. In step E, the slide-plate mold 14 is removed from the first male mold 12.

After the slide-plate mold 14 having the molded design portion 101 formed therein is removed from the first male mold 12, it is turned upside down so as to assemble to a second group of molds for forming the body portion 102 of the cap part of snap button 10. Please refer to FIG. 4. The second group of molds is provided in step F and includes a second female mold 21, and a second male mold 22. The second female mold 21 is open-bottomed and provided at a predetermined point on a top with a feed opening 211, and at two inner upper corners with a second pair of guide channels 212, with which the slide-plate mold 14 is movably engaged, as can been seen in step G. A post 30 to be provided at a rear side of the cap part of snap button 10 may be pre-positioned in the second male mold 22. In step H, the second female mold 21 and the second male mold 22 are closed to each other and a second injection molding is performed to form the body portion 102 of the cap part of snap button 10 and to associate the design portion 101 with the body portion 102. Meanwhile, the molding material is injected to enclose a predetermined length of the post 30. In step I, the second group of molds is opened. In step J, a molded product 23 is pushed out of the second male mold 22 using push pins 24 prepared in advance. Then, the slide-plate mold 14 is removed from the second female mold 21 and turned upside down again for use in step A of a next cycle of the molding process to movably mount in the first male mold 12 of the first group of molds.

Figure 5:
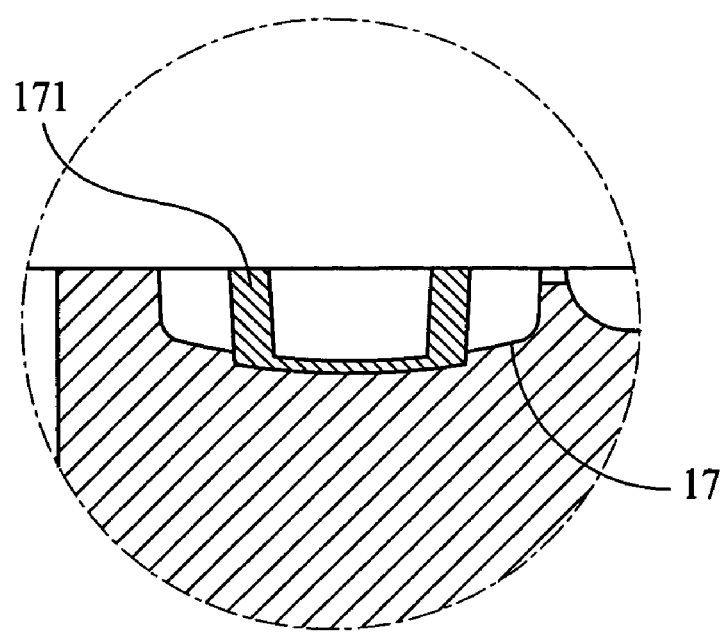
FIG. 5 is a fragmentary and enlarged sectional view of another feasible embodiment of the slide-plate mold shown in FIG. 3.
Figure 6:
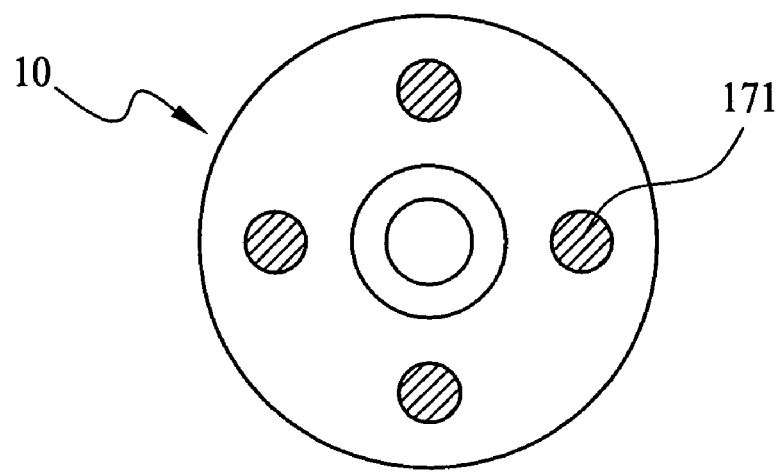
FIG. 6 is a rear view of a cap part of snap button formed using the slide-plate mold of FIG. 5.

Please refer to FIGS. 5 and 6. In another embodiment of the present invention, locating rings 171 are further provided in the mold cavities 17 on the slide-plate mold 14 for forming the design portion 101, depending on an actual design to be formed on the design portion 101, so as to ensure that a stable and firm molding in the second injection molding may be achieved.

Figure 7:
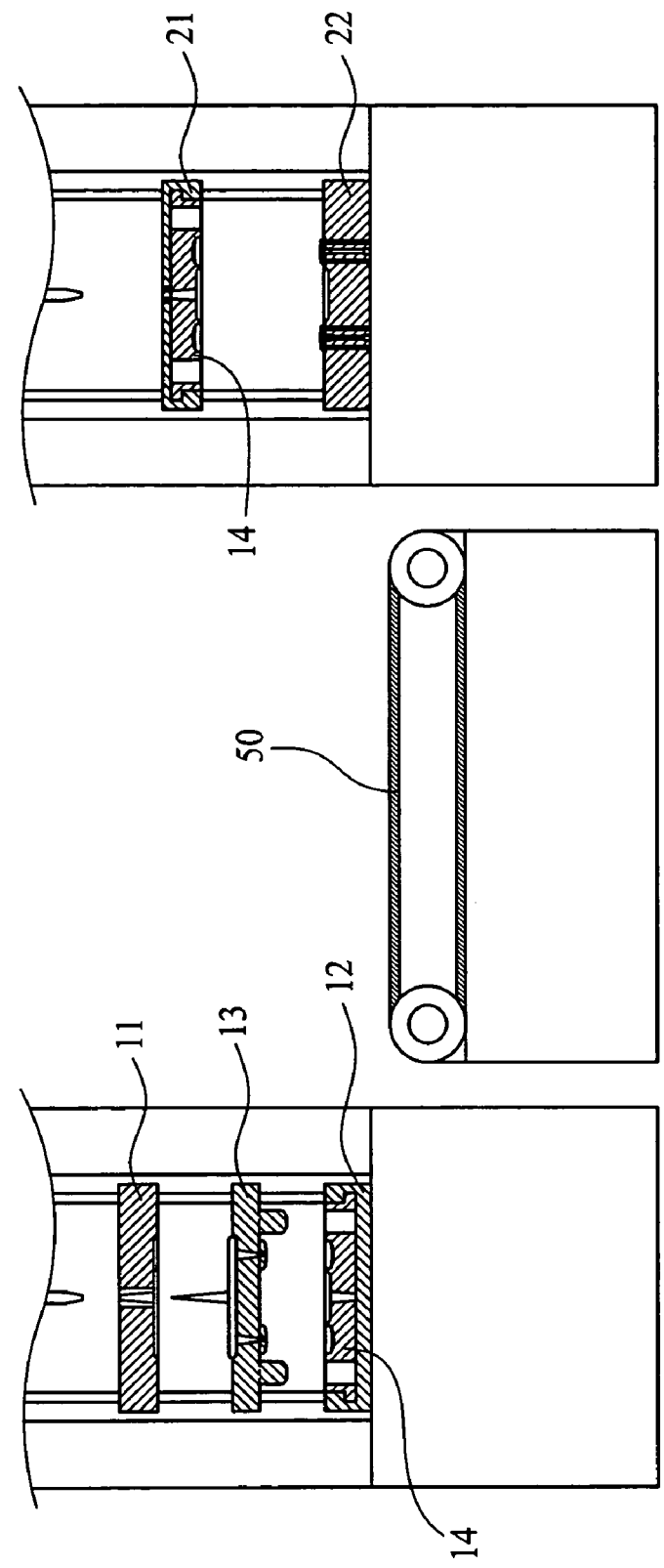
FIG. 7 schematically illustrates an automated apparatus according to an embodiment of the present invention for forming a multi-colored cap part of snap button.

Please refer to FIG. 7. A bi-directional conveyer 50 for conveying the slide-plate mold 14 is provided between the first group of molds 11, 12 and the second group of molds 21, 22, so as to enable a completely automated and operatorless process for producing the multi-colored cap part of snap button 10.

With the above-described method and apparatus, a multi-colored cap part of snap button may be formed through multiple injection molding using the same one mold core, that is, the slide-plate mold 14. It is no longer necessary for the molding material, which may be a plastic material, to be molded at any place other than the slide-plate mold 14. Moreover, either a closed or a non-closed design may be formed using the method and the apparatus of the present invention. The multi-colored cap part of snap button may be formed in a quick and convenient manner without the problems of deformed and undesirably compressed molding materials. In the case soft plastics are used for forming both the body portion and the design portion, the cap part of snap button may still be successfully injection molded. With the method and the apparatus of the present invention, the multi-colored cap part of snap button may be injection molded without being limited by the area of thrust surface. The method and the apparatus of the present invention are therefore very practical for use in industrial fields.

The present invention has been described with some preferred embodiments thereof and it is understood that many changes and modifications in the described embodiments can be carried out without departing from the scope and the spirit of the invention that is to be limited only by the appended claims.

What is claimed is:

1. A method for forming a multi-colored cap part of snap button, comprising the steps of:

forming a design portion of said cap part of snap button using a first group of molds, which including a first female mold, a first male mold, and a plate-shaped middle mold, and a slide-plate mold adapted to movably assembled to said first male mold, said first male mold having a first pair of guide channels slidably engaging the slide-plate mold, and said slide-plate mold including a plurality of mold cavities for forming said design portion;

removing said slide-plate mold from said first male mold of said first group of molds when said design portion has been formed in said slide-plate mold through a first injection molding;

movably positioning said slide-plate mold removed from said first male mold into a second female mold included in a second group of molds for forming a body portion of said cap part of snap button; said second female mold having a second pair of guide channels slidably engaging the slide-plate mold, said second group of molds also including a second male mold;

positioning a post for said cap part of snap button in said second male mold of said second group of molds; and forming said body portion of said cap part of snap button using said second group of molds through a second injection molding, so that said design portion formed through said first injection molding is associated with said body portion in said second injection molding to produce a molded finished product of said cap part of snap button.

2. The method for forming a multi-colored cap part of snap button as claimed in claim 1, further comprising a step of removing said slide-plate mold from said second group of molds after said finished product is formed, and movably engaging said slide-plate mold with said first male mold of said first group of molds again to start a next cycle of said method for forming said cap part of snap button.

3. The method for forming a multi-colored cap part of snap button as claimed in claim 2, wherein said slide-plate mold is transferred to and from said second group of molds via a bi-directional conveyer.

4. The method for forming a multi-colored cap part of snap button as claimed in claim 1, wherein said slide-plate mold is transferred to and from said second group of molds via a bi-directional conveyer.

5. The method for forming a multi-colored cap part of snap button as claimed in claim 1, wherein said slide-plate mold is provided in said mold cavities with locating elements.

6. The method for forming a multi-colored cap part of snap button as claimed in claim 1, wherein said second pair of guide channels slidably engage said slide-plate mold in an upside down position.

* * * * *